(12) United States Patent
Nakamura et al.

(10) Patent No.: US 11,802,744 B2
(45) Date of Patent: Oct. 31, 2023

(54) EXHAUST HEAT RECOVERY BOILER

(71) Applicant: KAWASAKI JUKOGYO KABUSHIKI KAISHA, Kobe (JP)

(72) Inventors: Ryo Nakamura, Kobe (JP); Yukihiro Takenaka, Kobe (JP); Takuro Nozoe, Kobe (JP); Tatsuo Ino, Kobe (JP); Atsushi Yukioka, Kobe (JP); Shuji Yamamoto, Kobe (JP); Toshinori Tanaka, Kobe (JP); Hao Zhang, Wuhu (CN); Wei Fang, Wuhu (CN)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/298,866

(22) PCT Filed: Feb. 13, 2019

(86) PCT No.: PCT/JP2019/004989
§ 371 (c)(1),
(2) Date: Jun. 1, 2021

(87) PCT Pub. No.: WO2020/110327
PCT Pub. Date: Jun. 4, 2020

(65) Prior Publication Data
US 2022/0034609 A1    Feb. 3, 2022

(30) Foreign Application Priority Data
Nov. 30, 2018 (CN) .......................... 201811451385.8

(51) Int. Cl.
*F28G 7/00* (2006.01)
*F22B 1/18* (2006.01)

(52) U.S. Cl.
CPC . *F28G 7/00* (2013.01); *F22B 1/18* (2013.01)

(58) Field of Classification Search
CPC ... F28G 7/00; F28G 1/10; F28G 15/02; F22B 1/18; F22B 37/48; F22B 37/36;
(Continued)

(56) References Cited

U.S. PATENT DOCUMENTS 8,888,413 B2 * 11/2014 Seider ...................... E02D 5/56
405/250
2018/0023806 A1   1/2018 Takenaka et al.

FOREIGN PATENT DOCUMENTS

CN           101592341 A         12/2009
CN           104930214 A    *    9/2015
(Continued)

OTHER PUBLICATIONS

English Translation of JP-2002220593-A dated Jun. 3, 2022 (Year: 2022).*
(Continued)

*Primary Examiner* — Edelmira Bosques
*Assistant Examiner* — Brett Peterson Mallon
(74) *Attorney, Agent, or Firm* — Oliff PLC

(57) ABSTRACT

An exhaust heat recovery boiler includes: a duct casing in which exhaust gas flows; a tubular extending portion extending upward from the duct casing; a heat exchanger tube located in the duct casing; a hammering rod connected to the heat exchanger tube in the duct casing and passing through an inside of the extending portion, the hammering rod including an upper part projecting to an outside of the extending portion; and an annular sleeve attached to the upper part of the hammering rod through a packing. The extending portion includes an upper flat surface which is located at an upper end of the extending portion, realizes a seal between the upper flat surface and a lower surface of the sleeve, and is annular and flat.

8 Claims, 4 Drawing Sheets

(58) Field of Classification Search
CPC .......... F22B 1/1807; F22B 37/00; F16B 7/00;
B08B 7/02; B06B 1/10; F28D 7/085;
F23J 3/023; F23J 3/00; F28F 2230/00
See application file for complete search history.

(56) References Cited

FOREIGN PATENT DOCUMENTS

| | | | | | |
|---|---|---|---|---|---|
| CN | 209524490 U | | 10/2019 | | |
| JP | S59-113604 U | | 8/1984 | | |
| JP | H07-167403 A | | 7/1995 | | |
| JP | H07167403 A | * | 7/1995 | | |
| JP | H08-252671 A | | 10/1996 | | |
| JP | 2002-220593 A | | 8/2002 | | |
| JP | 2002220593 A | * | 8/2002 | ................ | C10J 3/32 |
| JP | 2012-117725 A | | 6/2012 | | |
| JP | 2012117725 A | * | 6/2012 | | |
| JP | 2018-508739 A | | 3/2018 | | |
| WO | WO-2016127937 A2 | * | 8/2016 | ............. | F01K 23/10 |

OTHER PUBLICATIONS

English Translation of JPH07167403A dated Jun. 3, 2022 (Year: 2022).*
English Translation of CN-104930214-A dated Jun. 3, 2022 (Year: 2022).*
English Translation of JP-2012117725-A dated Jun. 3, 2022 (Year: 2022).*
English translation of WO-2016127937-A2, dated Jun. 15, 2023 (Year: 2023).*

* cited by examiner

EXHAUST HEAT RECOVERY BOILER

TECHNICAL FIELD

The present invention relates to an exhaust heat recovery boiler.

BACKGROUND ART

In an exhaust heat recovery boiler, water flowing through a heat exchanger tube is converted into steam by utilizing heat of exhaust gas, and with this, heat energy is recovered from the exhaust gas. When the exhaust gas supplied to the exhaust heat recovery boiler contains a large amount of dust, the dust accumulates on the heat exchanger tube, and this lowers recovery efficiency of the heat energy. As a countermeasure against this, an exhaust heat recovery boiler including a hammering rod is being proposed (see PTL 1, for example). The hammering rod is connected to the heat exchanger tube. By applying impact to the hammering rod from outside, the impact is transferred to the heat exchanger tube, and the dust accumulating on the heat exchanger tube falls. Thus, the recovery efficiency of the heat energy can be prevented from lowering.

CITATION LIST

Patent Literature

PTL 1: Published Japanese Translation of PCT Application No. 2018-508739

SUMMARY OF INVENTION

Technical Problem

In the exhaust heat recovery boiler, the heat exchanger tube is provided in a duct casing through which the exhaust gas flows. In the duct casing, the hammering rod is connected to the heat exchanger tube. Moreover, an upper part of the hammering rod projects to an outside of the duct casing and is strongly hit by an external mechanism. To be specific, since the hammering rod penetrates the duct casing, a seal between the hammering rod and the duct casing needs to be realized.

Moreover, both of the heat exchanger tube and the duct casing expand by the heat of the exhaust gas. However, since the water flows in the heat exchanger tube, the temperature of the heat exchanger tube does not increase significantly. On the other hand, the temperature of the duct casing increases to a temperature close to the temperature of the exhaust gas. Therefore, the amount of thermal expansion of the duct casing is larger than that of the heat exchanger tube, and the duct casing is displaced relative to the hammering rod. Even when the duct casing is displaced relative to the hammering rod as above, the seal between the hammering rod and the duct casing needs to be maintained.

The present invention was made under these circumstances, and an object of the present invention is to provide an exhaust heat recovery boiler configured such that even when a duct casing is displaced relative to a hammering rod, high seal performance between the hammering rod and the duct casing can be maintained.

Solution to Problem

An exhaust heat recovery boiler according to one aspect of the present invention includes: a duct casing in which exhaust gas flows; a tubular extending portion extending upward from the duct casing; a heat exchanger tube located in the duct casing; a hammering rod connected to the heat exchanger tube in the duct casing and passing through an inside of the extending portion, the hammering rod including an upper part projecting to an outside of the extending portion; and an annular sleeve attached to the upper part of the hammering rod through a packing. The extending portion includes an upper flat surface which is located at an upper end of the extending portion, realizes a seal between the upper flat surface and a lower surface of the sleeve, and is annular and flat.

According to the exhaust heat recovery boiler, the seal is realized between the lower surface of the sleeve and the upper flat surface of the extending portion. To be specific, since the seal is realized between the surfaces, a contact area is large, and therefore, high seal performance can be obtained. Moreover, when the high-temperature exhaust gas flows in the duct casing, the duct casing is displaced relative to the hammering rod. Therefore, the extending portion extending from the duct casing is displaced relative to the sleeve attached to the hammering rod. As described above, the contact area between the sleeve and the extending portion is large. Therefore, even when the sleeve is displaced relative to the extending portion, high seal performance can be maintained.

In the above exhaust heat recovery boiler, the upper flat surface of the extending portion may be in surface-contact with the lower surface of the sleeve.

According to the exhaust heat recovery boiler, since the upper flat surface of the extending portion and the lower surface of the sleeve are in surface-contact with each other, high seal performance between the hammering rod and the duct casing can be maintained although the configuration is simple.

The exhaust heat recovery boiler according to another aspect may further include one or a plurality of seal plates located between the lower surface of the sleeve and the upper flat surface of the extending portion and formed in an annular shape.

According to the exhaust heat recovery boiler, the seal between the lower surface of the sleeve and the upper flat surface of the extending portion is realized by using one or a plurality of seal plates. When the extending portion is displaced relative to the sleeve, the seal plates are slightly displaced relative to each other and gradually fit each other. With this, high seal performance between the hammering rod and the duct casing can be maintained.

The exhaust heat recovery boiler according to yet another aspect may further include a plurality of seal plates located between the lower surface of the sleeve and the upper flat surface of the extending portion and formed in an annular shape. The plurality of seal plates may include a first seal plate having a thickness which decreases as the first seal plate extends outward in a radial direction and a second seal plate arranged adjacent to the first seal plate and having a thickness which increases as the second seal plate extends outward in the radial direction.

The exhaust heat recovery boiler includes the first and second seal plates that are so-called tapered plates. Therefore, even when the lower surface of the sleeve is inclined relative to the upper flat surface of the extending portion, or even when the sleeve rattles, the seal plates can fit each other. On this account, high seal performance between the hammering rod and the duct casing can be maintained.

In the above exhaust heat recovery boiler, during a cold state in which the exhaust gas is not flowing in the duct casing, a central axis of the extending portion may be located closer to a middle side of the duct casing than a central axis of the hammering rod.

According to the exhaust heat recovery boiler, during the cold state, the central axis of the extending portion is located closer to the middle side of the duct casing than the central axis of the hammering rod. Therefore, during the hot state in which the exhaust gas is flowing in the duct casing, the central axis of the extending portion approaches the central axis of the hammering rod. As a result, during the hot state, positional deviation between a central axis of the lower surface of the sleeve and a central axis of the upper flat surface of the extending portion decreases, and therefore, high seal performance between the hammering rod and the duct casing can be maintained.

In the above exhaust heat recovery boiler, the extending portion may include: a cylindrical main body portion extending upward from the duct casing; and an annular horizontal portion extending outward in a radial direction from an upper end part of the main body portion and including an upper surface constituting the upper flat surface.

According to the exhaust heat recovery boiler, the upper surface of the horizontal portion extending outward in the radial direction from the upper end part of the main body portion constitutes the upper flat surface of the extending portion. Therefore, the upper flat surface of the extending portion can be easily formed.

The above exhaust heat recovery boiler may further include a bellows covering a boundary between the sleeve and the extending portion. The extending portion may include an outer wall portion extending downward from a radially outer end part of the horizontal portion. The bellows may include an upper end part fixed to an outer peripheral surface of the sleeve and a lower end part fixed to the outer wall portion of the extending portion.

Since the exhaust heat recovery boiler includes the bellows covering the boundary between the sleeve and the extending portion, the seal performance between the hammering rod and the duct casing can be improved. In addition, since the lower end part of the bellows is fixed to not the main body portion, which is high in temperature, of the extending portion but the outer wall portion located outside the main body portion in the radial direction, thermal damage of the bellows can be prevented.

In the above exhaust heat recovery boiler, the hammering rod may include: a circular column portion penetrating the sleeve and having a circular section; a square column portion having a square section, a coupling member being fixed to the square column portion, the heat exchanger tube being coupled to the square column portion through the coupling member; and an intermediate portion located between the circular column portion and the square column portion and formed in such a curved shape that a section of the intermediate portion changes from a circular shape to a square shape as the intermediate portion extends from the circular column portion toward the square column portion.

According to the exhaust heat recovery boiler, since the portion of the hammering rod which portion penetrates the sleeve has the circular section, the seal between the hammering rod and the sleeve can be easily realized. Moreover, since the portion of the hammering rod to which portion the coupling member is fixed has the square section, the fixing of the coupling member to the hammering rod can be easily performed. In addition, since the hammering rod includes the intermediate portion located between the circular column portion and the square column portion and formed in the curved shape, the dust can be prevented from accumulating at the boundary between the circular column portion and the square column portion.

Advantageous Effects of Invention

As described above, according to the above configuration, the present invention can provide the exhaust heat recovery boiler configured such that even when the duct casing is displaced relative to the hammering rod, high seal performance between the hammering rod and the duct casing can be maintained.

DESCRIPTION OF EMBODIMENTS

Embodiment 1

Figure 1:
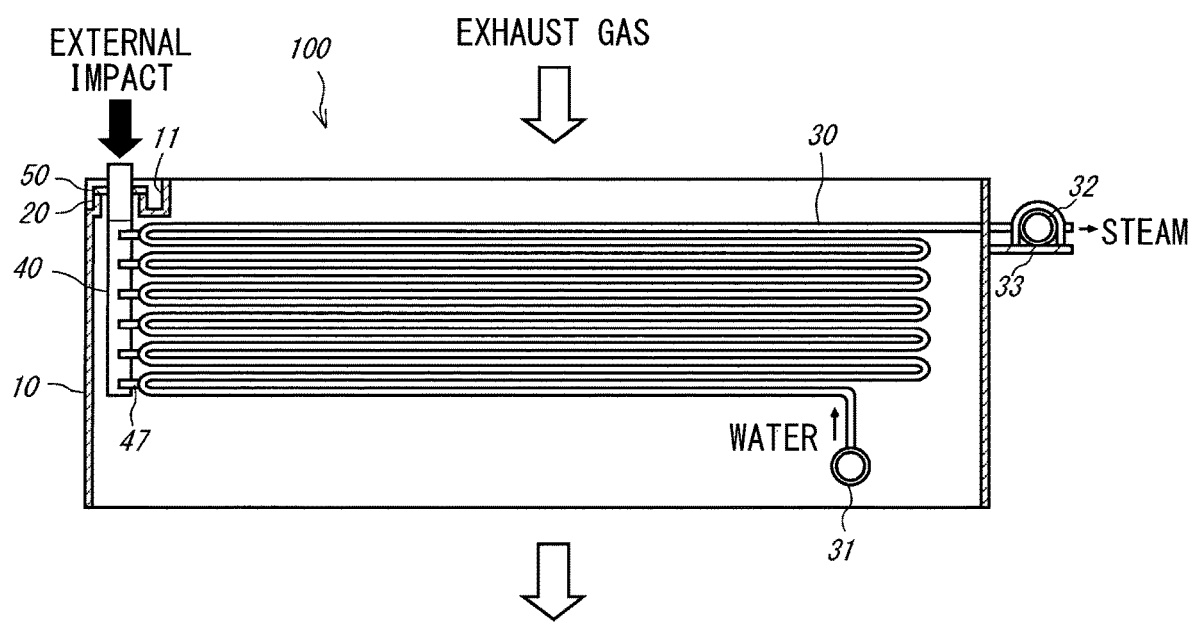
FIG. 1 is a sectional view showing an exhaust heat recovery boiler according to Embodiment 1.
Figure 2:
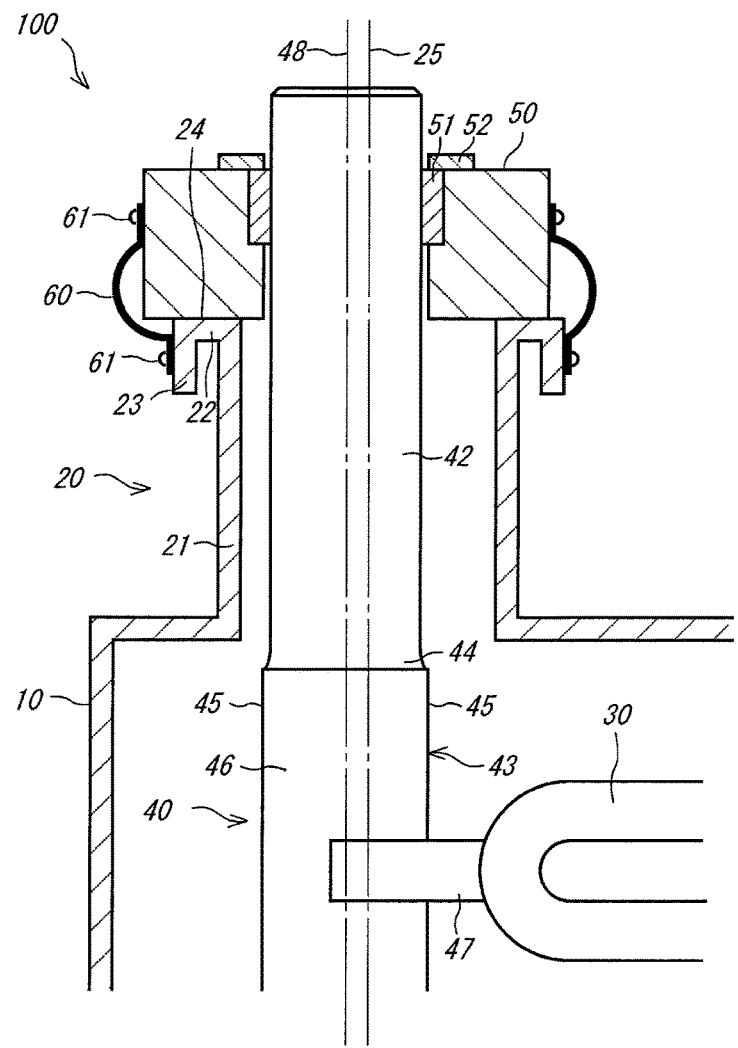
FIG. 2 is an enlarged view showing an upper part of a hammering rod shown in FIG. 1 and its periphery.
Figure 3:
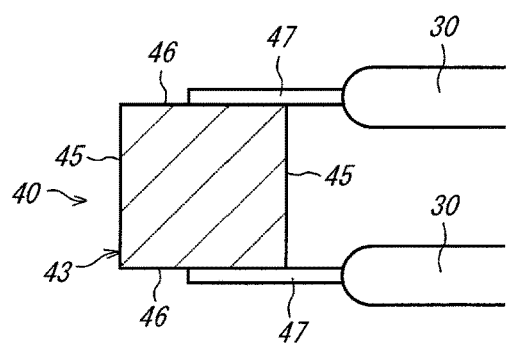
FIG. 3 is a horizontal sectional view showing a square column portion of the hammering rod shown in FIG. 1.

First, an exhaust heat recovery boiler 100 according to Embodiment 1 will be described with reference to FIGS. 1 to 3. FIG. 1 is a sectional view showing the exhaust heat recovery boiler 100. FIG. 2 is an enlarged view showing an upper part of a hammering rod shown in FIG. 1 and its periphery. FIG. 2 is a diagram during a cold state in which exhaust gas is not supplied to the exhaust heat recovery boiler 100.

The exhaust heat recovery boiler 100 is a facility configured to recover heat energy from the exhaust gas. A plurality of exhaust heat recovery boilers 100 according to the present embodiment are provided so as to be stacked on each other in an upper-lower direction. As shown in FIG. 1, the exhaust heat recovery boiler 100 according to the present embodiment includes a duct casing 10, extending portions 20, heat exchanger tubes 30, hammering rods 40, and sleeves 50. Moreover, as shown in FIG. 2, the exhaust heat recovery boiler 100 according to the present embodiment includes bellows 60. The following will describe these components in order.

Duct Casing

The duct casing 10 is a member constituting part of a duct in which the exhaust gas flows. Upper and lower surfaces of the duct casing 10 are open. The duct casing 10 is formed in a tubular shape having a substantially rectangular section. In the present embodiment, the exhaust gas flows downward in the duct casing 10. Moreover, the exhaust gas flowing in the duct casing 10 contains a large amount of dust. The exhaust gas of the present embodiment is assumed to be exhaust gas generated in the process of manufacturing cement. However, the exhaust gas is not limited to this. Furthermore, the duct casing 10 includes a recess 11 formed such that an outer surface of the duct casing 10 is concave inward. The recess 11 is located at an upper portion of one longitudinal end side (left side on a paper surface of FIG. 1) of the duct casing 10, and the below-described extending portion 20 is provided at the recess 11.

Extending Portion

The extending portion 20 is a tubular member extending upward from the duct casing 10. As described above, the extending portion 20 is provided at the recess 11 of the duct casing 10. As shown in FIG. 2, the extending portion 20 includes a cylindrical main body portion 21 extending upward from the duct casing 10, an annular horizontal portion 22 extending outward in a radial direction from an upper end part of the main body portion 21, and a cylindrical outer wall portion 23 extending downward from a radially outer end part of the horizontal portion 22. An upper surface of the horizontal portion 22 is an annular flat surface (horizontal surface) and constitutes an upper flat surface 24. The upper flat surface 24 is located at an upper end of the extending portion 20 and is in surface-contact with a lower surface of the below-described sleeve 50 to realize a seal between the upper flat surface 24 and the lower surface of the sleeve 50.

Heat Exchanger Tube

The heat exchanger tubes 30 are located in the duct casing 10, and the exhaust gas flows along outer surfaces of the heat exchanger tubes 30. The exhaust heat recovery boiler 100 according to the present embodiment includes a plurality of heat exchanger tubes 30, and the heat exchanger tubes 30 are arranged at regular intervals in a width direction (direction vertical to the paper surface of FIG. 1). Each of the heat exchanger tubes 30 extends in a horizontal direction (left-right direction on the paper surface of FIG. 1) while making a turn plural times. Water is supplied to each heat exchanger tube 30 through a water feed header 31. The water supplied to each heat exchanger tube 30 is converted into steam by heat energy of the exhaust gas. After the steam is once recovered by a steam header 32, the steam is supplied to a steam turbine (not shown).

Both of the heat exchanger tube 30 and the duct casing 10 expand by the heat of the exhaust gas. However, since the water flows in the heat exchanger tube 30, the temperature of the heat exchanger tube 30 does not increase significantly. On the other hand, the temperature of the duct casing 10 increases to a temperature close to the temperature of the exhaust gas. Therefore, during a hot state in which the exhaust gas is flowing in the duct casing 10, the thermal expansion of the duct casing 10 is larger than the thermal expansion of the heat exchanger tube 30. The steam header 32 to which each heat exchanger tube 30 is connected is supported by the duct casing 10 through a supporting member 33. Therefore, in the vicinity of the steam header 32, the duct casing 10 is hardly displaced relative to the heat exchanger tube 30. On the other hand, in a region (left side on the paper surface of FIG. 1) opposite to a position where the steam header 32 is provided, the duct casing 10 is relatively largely displaced relative to the heat exchanger tube 30.

Hammering Rod

The hammering rod 40 is a member which applies impact to the heat exchanger tubes 30 to make the dust, accumulating on the heat exchanger tubes 30, fall. The hammering rod 40 is connected to the heat exchanger tubes 30 in the duct casing 10 and passes through an inside of the extending portion 20. The hammering rod 40 includes the upper part projecting to an outside of the extending portion 20. When the upper part of the hammering rod 40 is hit by an external mechanism, the impact is applied to the hammering rod 40, and the impact is transferred to each heat exchanger tube 30.

The hammering rod 40 includes: a circular column portion 42 including the upper part; a square column portion 43 including a lower part; and an intermediate portion 44 located between the circular column portion 42 and the square column portion 43, and these portions are integrally formed. The circular column portion 42 penetrates the below-described sleeve 50 and is formed to have a circular section. Since the portion penetrating the sleeve 50 has the circular section as above, the seal (seal by using a below-described packing 51) between the sleeve 50 and the hammering rod 40 can be realized more easily than when the section has a shape other than the circular shape.

The square column portion 43 is a portion to which the heat exchanger tubes 30 are connected. The square column portion 43 is located in the duct casing 10. FIG. 3 is a horizontal sectional view showing the square column portion 43. As shown in FIG. 3, the square column portion 43 has a square section and includes a pair of vertical surfaces 45 and a pair of parallel surfaces 46. The vertical surfaces 45 are vertical to an extending direction (left-right direction on the paper surface of FIG. 3) of the heat exchanger tube 30, and the parallel surfaces 46 are parallel to the extending direction of the heat exchanger tube 30 and perpendicular to the vertical surfaces 45.

One of the heat exchanger tubes 30 which are located adjacent to each other in the width direction (upper-lower direction on the paper surface of FIG. 3) is coupled to one of the parallel surfaces 46, and the other heat exchanger tube 30 is connected to the other parallel surface 46. Moreover, each heat exchanger tube 30 is coupled to the square column portion 43 through a plate-shaped coupling member 47. The coupling member 47 is fixed to the hammering rod 40 by welding. In the present embodiment, the section of the portion to which the heat exchanger tube 30 is coupled is square. With this, the coupling member 47 is easily fixed to the hammering rod 40, and the heat exchanger tube 30 can be firmly connected to the hammering rod 40.

As described above, the intermediate portion 44 is a portion located between the circular column portion 42 and the square column portion 43. The intermediate portion 44 is formed in such a curved shape that a section of the intermediate portion 44 changes from a circular shape to a square shape as the intermediate portion 44 extends from the circular column portion 42 toward the square column portion 43. If the hammering rod 40 does not include the intermediate portion 44, the dust accumulates on portions (corner portions and the like) of an upper surface of the square column portion 43 which portions protrude from the circular column portion 42. However, since the hammering rod 40 includes the intermediate portion 44 in the present embodiment, the dust can be prevented from accumulating on the square column portion 43.

Moreover, as shown in FIG. 2, during the cold state in which the exhaust gas is not flowing in the duct casing 10, a central axis 25 of the extending portion 20 is located closer to a middle side of the duct casing 10 than a central axis 48 of the hammering rod 40. As described above, during the hot state in which the exhaust gas is flowing in the duct casing 10, the duct casing 10 is relatively largely displaced relative to the heat exchanger tube 30 in the region opposite to the position where the steam header 32 is provided. Therefore, although the central axis 25 of the extending portion 20 is not aligned with the central axis 48 of the hammering rod 40 during the cold state, the central axis 25 of the extending portion 20 approaches the central axis 48 of the hammering rod 40 during the hot state.

Sleeve

The sleeve 50 is a member attached to the upper part (circular column portion 42) of the hammering rod 40. In other words, the hammering rod 40 penetrates an inside of the sleeve 50. The sleeve 50 has an annular shape (cylindrical shape having a certain thickness or more), and the lower surface of the sleeve 50 is formed horizontally. Moreover, the sleeve 50 is attached to the hammering rod 40 through the packing 51. When impact is applied to the hammering rod 40, the hammering rod 40 is displaced relative to the sleeve 50 in the upper-lower direction to some extent. Furthermore, an annular cover 52 is attached to an upper surface of the sleeve 50 so as to cover the packing 51.

In the present embodiment, the lower surface of the sleeve 50 is in surface-contact with the upper flat surface 24 of the extending portion 20, and the seal is realized between the lower surface of the sleeve 50 and the upper flat surface 24 of the extending portion 20. To be specific, in the present embodiment, since the seal is realized between the surfaces, a contact area is large, and therefore, high seal performance can be secured. It should be noted that the lower surface of the sleeve 50 and the upper flat surface 24 of the extending portion 20 are not fixed to each other, and the sleeve 50 is movable relative to the extending portion 20 in the horizontal direction.

As described above, during the hot state, in the region opposite to the position where the steam header 32 is provided, the duct casing 10 is relatively largely displaced relative to the heat exchanger tube 30. Therefore, the extending portion 20 extending from the duct casing 10 is displaced relative to the sleeve 50 attached to the hammering rod 40. In the present embodiment, the contact area between the sleeve 50 and the upper flat surface 24 of the extending portion 20 is large as described above. Therefore, even when the extending portion 20 is displaced relative to the sleeve 50, high seal performance can be maintained.

Bellows

The bellows 60 is a member covering a boundary between the extending portion 20 and the sleeve 50. Since the bellows 60 covers the boundary between the extending portion 20 and the sleeve 50, the seal performance between the hammering rod 40 and the duct casing 10 can be improved. An upper end part of the bellows 60 is fixed to an outer peripheral surface of the sleeve 50, and a lower end part of the bellows 60 is fixed to the outer wall portion 23 of the extending portion 20. Since the lower end part of the bellows 60 is fixed to not the main body portion 21, which is high in temperature, but the outer wall portion 23, thermal damage of the bellows can be prevented.

The bellows 60 is fixed to the outer peripheral surface of the sleeve 50 and the outer wall portion 23 of the extending portion 20 by using fixing members 61. As the fixing members 61, bolts, belts, or the like may be adopted.

Embodiment 2

Figure 4:
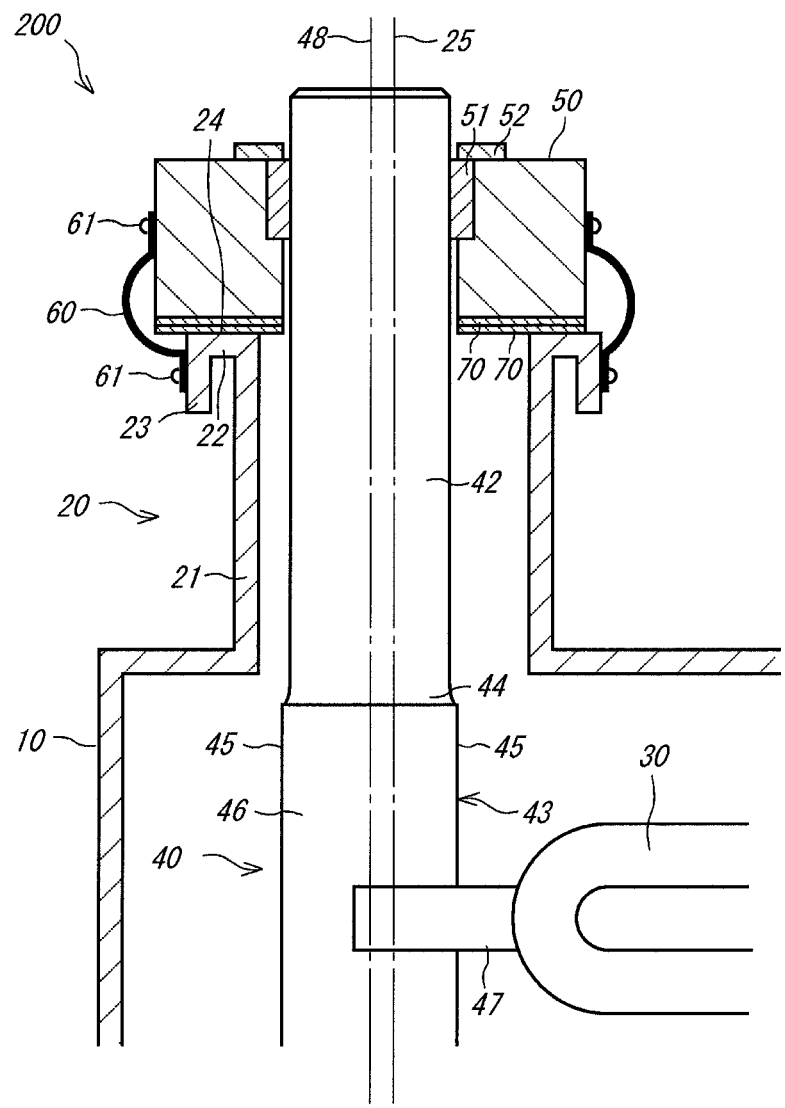
FIG. 4 is an enlarged view showing the upper part of the hammering rod according to Embodiment 2 and its periphery.

Next, an exhaust heat recovery boiler 200 according to Embodiment 2 will be described with reference to FIG. 4. FIG. 4 is an enlarged view showing the upper part of the hammering rod 40 according to Embodiment 2 and its periphery and corresponds to FIG. 2 of Embodiment 1. As shown in FIG. 4, the exhaust heat recovery boiler 200 according to the present embodiment is different in configuration from the exhaust heat recovery boiler 100 according to Embodiment 1 in that the exhaust heat recovery boiler 200 includes two seal plates 70 located between the lower surface of the sleeve 50 and the upper flat surface 24 of the extending portion 20. Other than the above, the exhaust heat recovery boiler 200 according to the present embodiment is the same in configuration as the exhaust heat recovery boiler 100 according to Embodiment 1.

Each of the seal plates 70 is formed in an annular shape and may be made of metal or silicon. Moreover, the exhaust heat recovery boiler 200 of the present embodiment includes two seal plates 70 but may include only one seal plate 70 or three or more seal plates 70. It should be noted that the seal plates 70 are not fixed to each other and are not fixed to the lower surface of the sleeve 50 and the upper flat surface 24 of the extending portion 20.

As above, in the present embodiment, the seal between the lower surface of the sleeve 50 and the upper flat surface 24 of the extending portion 20 is realized by using the seal plates 70. When the extending portion 20 is displaced relative to the sleeve 50 during the hot state, the seal plates 70 are slightly displaced relative to each other and gradually fit each other. With this, high seal performance between the hammering rod 40 and the duct casing 10 can be maintained.

Embodiment 3

Figure 5:
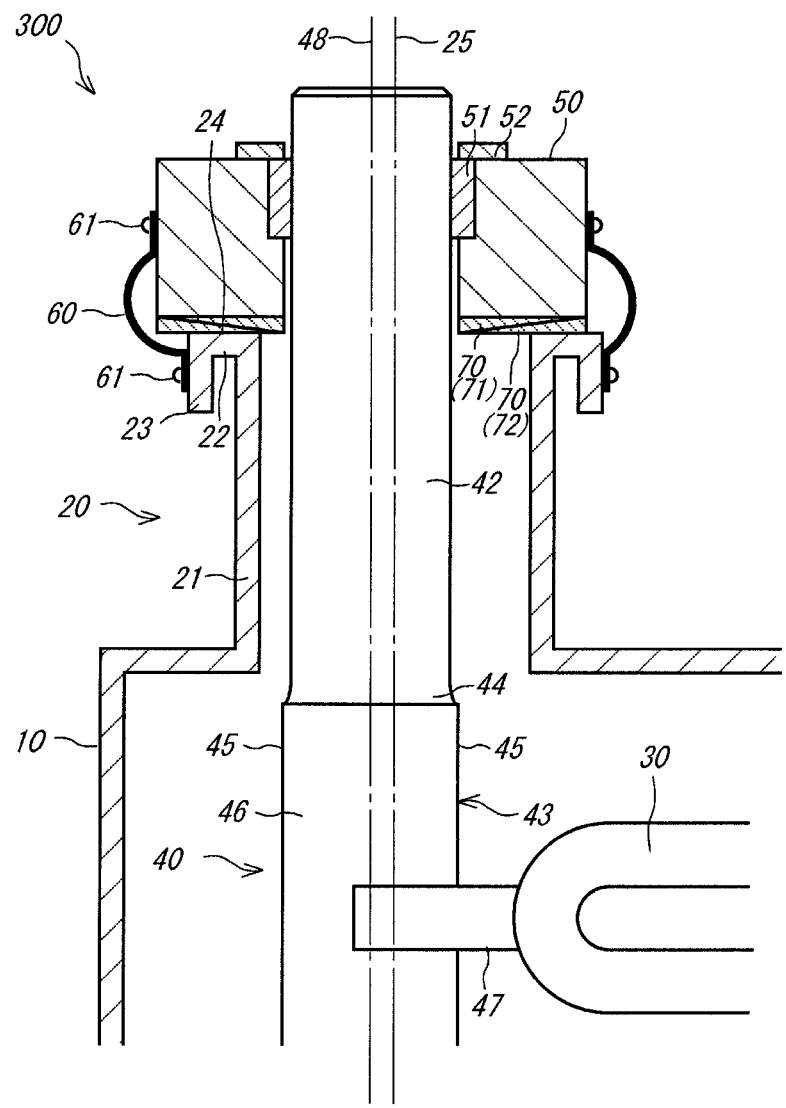
FIG. 5 is an enlarged view showing the upper part of the hammering rod according to Embodiment 3 and its periphery.

Next, an exhaust heat recovery boiler 300 according to Embodiment 3 will be described with reference to FIG. 5. FIG. 5 is an enlarged view showing the upper part of the hammering rod 40 according to Embodiment 3 and its periphery and corresponds to FIG. 2 of Embodiment 1 and FIG. 4 of Embodiment 2. As shown in FIG. 5, as with Embodiment 2, the exhaust heat recovery boiler 300 according to the present embodiment is different in configuration from the exhaust heat recovery boiler 100 according to Embodiment 1 in that the exhaust heat recovery boiler 300 includes two seal plates 70 located between the upper flat surface 24 of the extending portion 20 and the lower surface of the sleeve 50. It should be noted that the exhaust heat recovery boiler 300 according to the present embodiment is different in configuration from the exhaust heat recovery boiler 200 according to Embodiment 2 in that in the present embodiment, the seal plates 70 are so-called tapered plates. Other than the above, the exhaust heat recovery boiler 300 according to the present embodiment is the same in configuration as the exhaust heat recovery boiler 100 according to Embodiment 1 and the exhaust heat recovery boiler 200 according to Embodiment 2.

In the present embodiment, the two seal plates 70 are constituted by a first seal plate 71 and a second seal plate 72. The first seal plate 71 is arranged above and adjacent to the second seal plate 72 and is formed such that a thickness of the first seal plate 71 decreases as the first seal plate 71 extends outward in the radial direction. On the other hand, the second seal plate 72 is arranged under and adjacent to the first seal plate 71 and is formed such that a thickness of the second seal plate 72 increases as the second seal plate 72 extends outward in the radial direction. It should be noted that the seal plates 71 and 72 are not fixed to each other and are not fixed to the lower surface of the sleeve 50 and the upper flat surface 24 of the extending portion 20.

As above, in the present embodiment, the first and second seal plates that are so-called tapered plates are inserted between the lower surface of the sleeve 50 and the upper flat surface 24 of the extending portion 20. Therefore, for example, even when the lower surface of the sleeve 50 is inclined relative to the upper flat surface 24 of the extending portion 20, or even when the sleeve 50 rattles, the seal plates 70 (71 and 72) can fit each other. On this account, high seal performance between the hammering rod 40 and the duct casing 10 can be maintained.

REFERENCE SIGNS LIST 10 duct casing
20 extending portion
21 main body portion
22 horizontal portion
23 outer wall portion
24 upper flat surface
25 central axis (extending portion)
30 heat exchanger tube
40 hammering rod
42 circular column portion
43 square column portion
44 intermediate portion
47 coupling member
48 central axis (hammering rod)
50 sleeve
51 packing
60 bellows
70 seal plate
71 first seal plate
72 second seal plate
100, 200, 300 exhaust heat recovery boiler

The invention claimed is:

1. An exhaust heat recovery boiler comprising:
a duct casing in which exhaust gas flows;
a tubular extending portion extending upward from the duct casing;
a heat exchanger tube located in the duct casing;
a hammering rod connected to the heat exchanger tube in the duct casing and passing through an inside of the extending portion, the hammering rod including an upper part projecting to an outside of the extending portion; and
an annular sleeve attached to the upper part of the hammering rod through a packing, wherein:
in a state in which the sleeve is attached to the upper part of the hammering rod, the sleeve is movable relative to the extending portion in a radial direction relative to a central axis of the extending portion, and
the extending portion includes an upper flat surface which is located at an upper end of the extending portion, realizes a seal between the upper flat surface and a lower surface of the sleeve, and is annular and flat.

2. The exhaust heat recovery boiler according to claim 1, wherein the upper flat surface of the extending portion is in surface-contact with the lower surface of the sleeve.

3. The exhaust heat recovery boiler according to claim 1, further comprising one or a plurality of seal plates located between the lower surface of the sleeve and the upper flat surface of the extending portion and formed in an annular shape.

4. The exhaust heat recovery boiler according to claim 1, further comprising a plurality of seal plates located between the lower surface of the sleeve and the upper flat surface of the extending portion and formed in an annular shape, wherein
the plurality of seal plates include
a first seal plate having a thickness which decreases as the first seal plate extends outward in the radial direction and
a second seal plate arranged adjacent to the first seal plate and having a thickness which increases as the second seal plate extends outward in the radial direction.

5. The exhaust heat recovery boiler according to claim 1, wherein during a cold state in which the exhaust gas is not flowing in the duct casing, the central axis of the extending portion is located closer to a middle side of the duct casing than a central axis of the hammering rod.

6. The exhaust heat recovery boiler according to claim 1, wherein the extending portion includes:
a cylindrical main body portion extending upward from the duct casing; and
an annular horizontal portion extending outward in the radial direction from an upper end part of the main body portion and including an upper surface constituting the upper flat surface.

7. The exhaust heat recovery boiler according to claim 6, further comprising a bellows covering a boundary between the sleeve and the extending portion, wherein:
the extending portion includes an outer wall portion extending downward from a radially outer end part of the horizontal portion; and
the bellows includes an upper end part fixed to an outer peripheral surface of the sleeve and a lower end part fixed to the outer wall portion of the extending portion.

8. The exhaust heat recovery boiler according to claim 1, wherein the hammering rod includes:
a circular column portion penetrating the sleeve and having a circular section;
a square column portion having a square section, a coupling member being fixed to the square column portion, the heat exchanger tube being coupled to the square column portion through the coupling member; and
an intermediate portion located between the circular column portion and the square column portion and formed in such a curved shape that a section of the intermediate portion changes from a circular shape to a square shape as the intermediate portion extends from the circular column portion toward the square column portion.

\* \* \* \* \*